United States Patent Office
3,481,921
Patented Dec. 2, 1969

3,481,921
BENZODIAZEPINES
George Francis Field, Nutley, and Leo Henryk Sternbach, Upper Montclair, N.J., assignors to Hoffmann-La Roche Inc., Nutley, N.J., a corporation of New Jersey
No Drawing. Filed Oct. 22, 1965, Ser. No. 502,383
Int. Cl. C07d 53/06; A61k 27/00
U.S. Cl. 260—239
17 Claims

ABSTRACT OF THE DISCLOSURE 2-substituted 1,4-benzodiazepines and 1,4-benzodiazepine 4-oxides are described. The substituent in the 2-position can be prepared by addition across a 1,2 double bond. The products are useful as anticonvulsant agents and muscle relaxants.

---

This invention relates to novel benzodiazepines, to processes for their preparation and to novel intermediates useful in the preparation thereof. More particularly, the invention relates to 1,4-benzodiazepines and 1,4-benzodiazepine 4-oxides of the formula

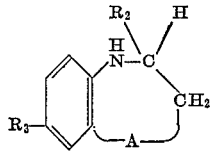

(I)

wherein A represents the group

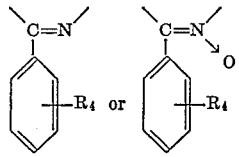

$R_2$ represents hydroxy, lower alkoxy, aryloxy, ar-alkoxy, amino, cyano, a substituted amino group of the formula

a thio group of the formula $-S-R_7$, lower alkoxyformimidoyl, lower alkanoyloxy, benzoyloxy, lower alkoxycarbonyl, or cyclic amidine; $R_3$ represents hydrogen, halogen, trifluoromethyl, lower alkyl, lower alkoxy, nitro, lower alkylthio, lower alkyl sulfinyl or lower alkyl sulfonyl; $R_4$ represents hydrogen, halogen, trifluoromethyl, lower alkyl, lower alkoxy, nitro, cyano, amino, lower alkylthio, lower alkyl sulfinyl or lower alkyl sulfonyl; $R_5$ and $R_6$ are each independently selected from the group consisting of hydrogen, lower alkyl, aryl, ar-alkyl, lower alkanoyl or benzoyl, and taken together with the nitrogen atom to which they are attached represent alkylene imino in which the lower alkylene radical contains from 3 to 6 carbon atoms; and $R_7$ represents hydrogen, lower alkyl, aryl or ar-alkyl, and acid addition salts thereof.

As used herein, the term "lower alkyl" denotes saturated straight and branched chain hydrocarbon groups such as, for example, methyl, ethyl, propyl, isopropyl, and the like. The term "halogen" comprehends all four halogens, i.e., iodine, bromine, fluorine and chlorine (the latter three being preferred). The terms "lower alkylthio," "lower alkyl sulfinyl," "lower alkyl sulfonyl," and "lower alkoxy" comprehend moieties wherein the lower alkyl portion is as defined for lower alkyl above, for example, methoxy, ethoxy, methylthio, ethylthio, methyl sulfinyl, methyl sulfonyl, and the like. The term "aryl" comprehends aromatic monocyclichydrocarbons such as phenyl, tolyl, and the like. The term "aryloxy" comprehends aromatic monocyclic hydrocarbonoxy groups such as phenoxy, and the like. The term "ar-alkyl" comprehends phenyl lower alkylene groups such as benzyl, phenethyl, and the like. The term "lower alkanoyl" denotes a —COR group wherein R is lower alkyl as defined above. The term "cyclic amidine" denotes a group of the formula

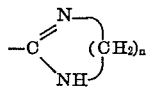

wherein $n$ is an integer from 2 to 4. The term "lower alkoxyformimidoyl" denotes the group

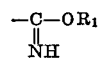

wherein $R_1$ is H or lower alkyl. The term "lower alkanoyloxy" denotes the group

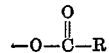

wherein R is lower alkyl. The term "lower alkoxycarbonyl" denotes the group —COOR wherein R is lower alkyl.

The novel end products of this invention, i.e., the compounds of Formula I are prepared from compounds of the formula

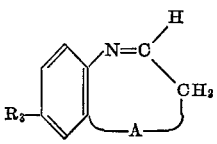

(II)

wherein the symbols A and $R_3$ have the same significance as hereinabove, by the addition of water, alcohol, a primary or a secondary amine, alkanoic acid, benzoylamide lower alkanoylamide, hydrogen cyanide, or a mercaptan to the 1,2-double bond, and in the case of hydrogen cyanide addition, if desired, hydrolyzing with acid or base or treating with an alkylenediamine. The compounds of Formula II above are also novel and thus constitute a part of this invention. The compounds of Formula II are prepared from compounds of the formula

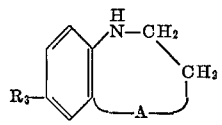

(III)

wherein the symbols A and $R_3$ have the same significance as hereinabove, by introducing the double bond into the 1,2-position. The preparation of the novel compounds of this invention can be traced with respect to the following flow sheet.

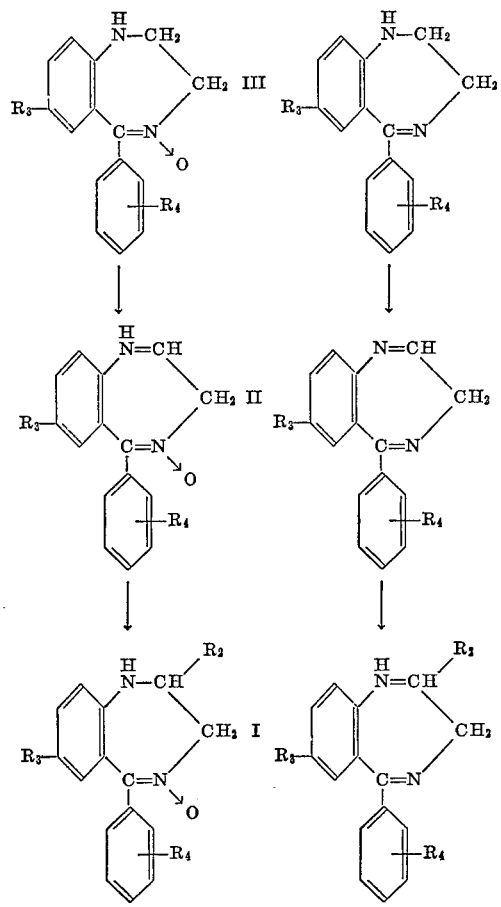

wherein the symbols $R_2$–$R_4$ have the same significance as like symbols hereinabove.

The starting materials of this invention, i.e., the compounds of Formula III above are known compounds.

The compounds of Formula II are prepared by oxidation of the 1,2-dihydro-1,4-benzodiazepines and benzodiazepine 4-oxides of Formula III, i.e., introduction of a double bond into the 1,2-position. The oxidation is conveniently effected by reacting a compound of Formula III with an oxidizing agent such as manganese dioxide. The reaction is preferably carried out under anhydrous conditions and at elevated temperatures. It can be suitably carried out in an inert organic solvent such as, for example, aromatic hydrocarbons, e.g., benzene, and the like. Preferred solvents are those which form water azeotropes. A preferred temperature range for the reaction is between about room temperature and the boiling point of the reaction mixture.

Compounds of Formula I wherein $R_2$ is hydroxy are prepared by simply crystallizing a compound of Formula II from an organic solvent containing water. As solvent there can be used any water-miscible inert organic solvent such as tetrahydrofuran, and the like. The addition of alcohol, an alkanoic acid, e.g., acetic, propionic, butanoic, etc., benzoylamide, or a lower alkanoylamide, e.g., acetamide, propionamide, valeramide, etc., to compounds of Formula II can be effected by simply mixing the reactants in a suitable inert solvent and crystallizing the product by the usual techniques. In the case of alcohol addition, the appropriate alcohol, preferably a lower alkanol, such as methanol, ethanol, N-propanol, isopropanol, and the like, can be employed as the solvent. Other inert solvents, such as, hydrocarbon solvents, etc., could also be employed. The acid and amide additions can be carried out in any of the ordinary inert organic solvents, such as, for example, hydrocarbon solvents, methylene chloride, and the like. Alternatively, introduction of the hydroxy group or the ether group into the molecule can be accomplished by treatment with water in the case of hydroxy or the appropriate alcohol in the case of an ether group in the presence of an acid or a base catalyst. Any suitable acid or base can be utilized in the reaction. Thus, for example, in the acid catalyzed formation of Formula I compounds, there can be employed any organic acid in alcoholic solution, such as methanolic HCl, etc. In the base catalyzed group, there can be suitably employed alcoholates of the alkali metals, such as sodium methylate, etc.

Addition of an amino group to the 1,2-double bond of the compounds of Formula II is accomplished by treating a Formula II compound with an appropriate amine. Suitable amines are, for example, ammonia or any primary amine such as N-lower alkylamines, e.g., N-methylamine, N-ethylamine, and the like; N-cyclo-lower alkylamines, e.g., N-cyclopentylamine, N-cyclohexylamine, and the like; carbocyclic arylamines, e.g., N-phenylamines, and the like, or N-carbocyclic aryl-lower alkylamines, e.g., N-benzylamine, and the like, or secondary amines such as N,N-di-lower alkylamines, e.g., N,N-dimethylamine, N-methyl-N-ethylamine, N,N-propylamine, and the like; N-cycloalkyl-N-lower alkylamines, e.g., N-cyclopentyl-N-methylamine, N-cyclohexyl-N-methylamine, and the like; N-carbocyclic aryl-lower alkyl-N-lower alkylamines, e.g., N - benzyl-N-methylamine, N-methyl-N-phenethylamine, and the like; heterocyclic compounds in which the secondary amino group is part of the heterocyclic ring, such as pyrrolidine, piperidine, piperazine, morpholine, and the like.

Introduction of a thio group is accomplished by treating a compound of Formula II with an appropriate mercaptan. Suitable mercaptans are, for example, lower alkyl mercaptans, e.g., methyl mercaptan, ethyl mercaptan, n-propyl mercaptan, isopropyl mercaptan, and the like; monocyclic carbocyclic aryl mercaptans, such as phenyl mercaptan and substituted phenyl mercaptan; monocyclic carbocyclic aryl-lower alkyl mercaptans, e.g., benzyl mercaptan, phenethyl mercaptan, and the like or substituted benzyl mercaptans, such as substituted phenyl mercaptans, and the like.

Compounds of Formula I wherein $R_2$ is lower alkoxy formimidoyl are prepared by treating a compound of Formula II with hydrogen cyanide in the presence of a strong base or a suitable cyanide salt, e.g., sodium cyanide, in the appropriate lower alkanol. The reaction is conveniently effected at room temperature though higher or lower temperatures could be employed. The 2-($\alpha$-iminoalkoxy)-1H-1,4-benzodiazepine compounds prepared in this way can be submitted to either acid or base hydrolysis. Hydrolysis with any of the usual bases, e.g., sodium hydroxide, gives the corresponding 2-carboxylic-1H-1,4-benzodiazepine compounds. Hydrolysis with acid, for example, with a mineral acid, such as HCl, gives the corresponding 2 - lower alkoxycarbonyl-1H-1,4-benzodiazepine compounds. Treatment of the 2-($\alpha$-iminoalkoxy)-1H - 1,4-benzodiazepine compound with an alkylenediamine, e.g., ethyleneamine, propyleneamine, etc., gives the corresponding 2-amidine compound.

Alternatively, the compounds of Formula I wherein A represents the group

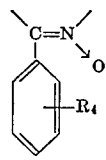

and $R_2$ is lower alkoxy, can be prepared from a compound of the formula

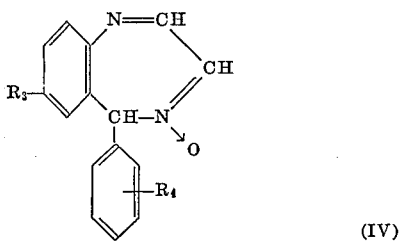

(IV)

wherein $R_3$ and $R_4$ have the same significance as hereinabove, by treating with an alkali metal alkoxide. The compounds of Formula IV above can be prepared from known benzophenone oximes according to the following reaction sequence:

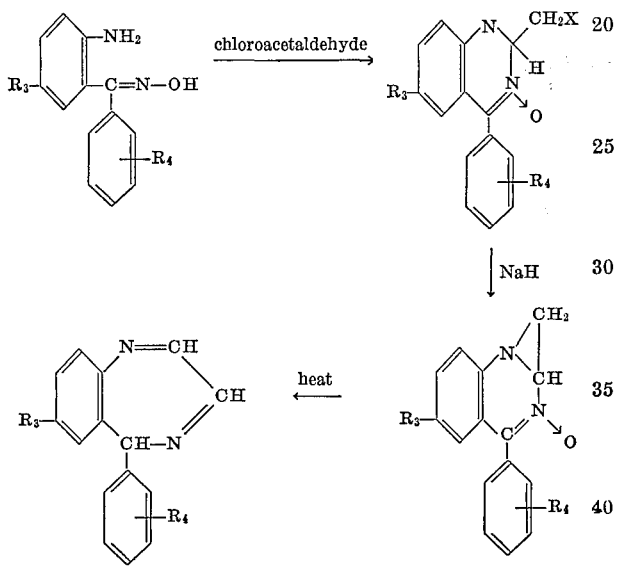

The preparation of the compounds of Formula IV is not a part of this invention but is disclosed herein for the sake of completeness.

The novel compounds of this invention, i.e., the compounds of Formulas I and II, are pharmaceutically useful compounds. More specifically, they are useful as anticonvulsant agents and muscle relaxants. They can be administered internally, for example, orally or parenterally, with dosage adjusted to individual requirements. They can be placed in conventional solid or liquid pharmaceutical administration forms, such as dispersions, capsules, emulsions, suspensions, tablets, or the like, and can be combined with conventional solid or liquid carriers, such as cornstarch, lactose, carboxymethyl cellulose, and the like. They form acid addition salts with either organic or inorganic acids, such as acetic acid, succinic acid, maleic acid, hydrohalic acid, sulfuric acid, phosphoric acid, and the like. Their acid addition salts can be converted to either the free base from or into pharmaceutically acceptable acid addition salts by conventional techniques, for example, by neutralization, and then, if desired, by reaction with a pharmaceutically acceptable acid.

The novel compounds and processes of this invention will be more fully understood from the following examples which are to be construed as illustrative but not limitative of the invention. All temperatures are stated in degrees centigrade and all melting points have been corrected.

EXAMPLE 1

The major portion of the water contained in 100 g. of commercial manganese dioxide (obtained from General Metallic Oxides Co., type No. 37) was removed by boiling a stirred suspension in 1 liter of benzene under a Dean-Stark water separator for 2 hours. To this hot suspension was added 10 g. of 7-chloro-2,3-dihydro-5-phenyl-1H-1,4-benzodiazepine. After this mixture had been stirred and heated under reflux under the Dean-Stark separator for 6 hours, the manganese dioxide was removed by filtration. The filtrate was concentrated in vacuo and the residue crystallized from a mixture of ether and hexane to give 7-chloro - 5 - phenyl-3H-1,4-benzodiazepine melting at 97–100°. By two crystallizations from ethyl acetate, the compound was obtained as off-white prisms, melting at 101–104°.

EXAMPLE 2

A suspension of 300 g. of commercial manganese dioxide (General Metallic Oxides, type 37) in 3 liters of benzene was dried by stirring and boiling under a Dean-Stark water trap for 4.5 hours. To this suspension was added 30 g. of 7 - chloro-1,2-dihydro-5-phenyl-3H-1,4-benzodiazepine 4-oxide and the mixture stirred and boiled for 2 hours under the water separator. The mixture was allowed to cool to room temperature overnight and the manganese dioxide was filtered off. The benzene filtrate was concentrated in vacuo to leave 7-chloro-5-phenyl-3H-1,4-benzodiazepine 4-oxide melting at 159–161°. An analytical sample was obtained as white prisms, melting at 159–161° by recrystallization from ethyl acetate.

EXAMPLE 3

Recrystallization of 7-chloro-5-phenyl-3H-1,4-benzodiazepine 4-oxide from ethanol gave 7-chloro-2-ethoxy-2,3-dihydro-5-phenyl-1H-1,4-benzodiazepine 4-oxide as off-white prisms melting at 132–133°.

EXAMPLE 4

Preparation of 7-chloro-2,3-dihydro-2-methoxy-5-phenyl-1H-1,4-benzodiazepine 4-oxide from 7-chloro-5-phenyl-3H-1,4-benzodiazepine 4-oxide A solution of 1 g. (3.7 m. mole) of 7-chloro-5-phenyl-3H-1,4-benzodiazepine 4-oxide in 50 ml. of methanol was heated under reflux for 0.5 hour and then concentrated to dryness in vacuo. The residue was crystallized from ether and recrystallized from methanol to give 7-chloro-2,3-dihydro-2-methoxy-1H-1,4 - benzodiazepine 4-oxide, M.P. 120–130°. Recrystallization from methanolic ether gave the product of melting point 127–131°.

EXAMPLE 5

Preparation of 7-chloro-2,3-dihydro-2-methoxy-5-phenyl-1H-1,4-benzodiazepine 4-oxide from 2-amino-5-chlorobenzophenone β-oxime Chloroacetaldehyde diethylacetal (46 ml.) was heated under reflux for 15 minutes with 1.5 N hydrochloric acid (46 ml., 0.069 mole). This solution was cooled to 10° and added to a cold (10°) solution of 2-amino-5-chlorobenzophenone β-oxime (49.3 g.) prepared by dissolving the oxime in warm ethanol (100 ml.) and cooling. The mixture was stirred without further cooling for 15 minutes (reaction is exothermic). The product 2-chloromethyl-6-chloro-1,2-dihydro-4-phenylquinazoline 3-oxide separated and was collected and washed with hexane.

A solution of 4.6 g. (0.015 mole) of 6-chloro-2-chloromethyl-1,2-dihydro-4-phenylquinazoline 3-oxide prepared as above in 100 ml. of tetrahydrofuran was treated with 0.68 g. (0.015 mole) of a 53.5 percent suspension of sodium hydride in mineral oil and the mixture stirred at room temperature for 0.8 hour. Traces of sodium hydride remaining were destroyed by addition of ethanol. The mixture was then filtered, concentrated to dryness and the residue crystallized from benzene/hexane to give light yellow crystals of 7-chloro-1,2-dihydro - 5 - phenyl - 2H-azirino[1,2-a]quinazoline 4-oxide, M.P. 125–131°. A solution of 4 g. (14.8 mmoles) of 7-chloro-1,2-dihydro-5-phenyl-2H-azirino[1,2-a]quinazoline 4-oxide obtained in this manner in 200 ml. of toluene was heated under reflux for 40 minutes. The toluene was removed in vacuo and the residue crystallized from ether/petroleum ether to give the isomer 7-chloro-5-phenyl-5H-1,4-benzodiazepine 4-oxide, M.P. 151–158°. Recrystallization from ethanol gave yellow prisms, M.P. 157–158.5°.

A solution of 10.3 g. (38 mmoles) of 7-chloro-5-phenyl-5H-1,4-benzodiazepine 4-oxide prepared as above in 250 ml. of methanol containing 3 g. (55 mmoles) of sodium methoxide was heated under reflux for 20 minutes and then allowed to stand 18 hours at room temperature. The solution was then neutralized with methanolic hydrogen chloride, filtered and concentrated in vacuo. The residue was crystallized from methanol. The solid was collected and recrystallized from ca. 50 ml. of methanol to give 7-chloro-2,3-dihydro - 2 - methoxy - 5 - phenyl - 1H - 1,4-benzodiazepine 4-oxide as pale yellow prisms. Upon recrystallization from methanol/ether the compound melted at 127–131° (dec.).

EXAMPLE 6

Preparation of 7-trifluoromethyl-2,3-dihydro-2-methoxy-5-phenyl-1H-1,4 - benzodiazepine hydrochloride from 2,3-dihydro-5-phenyl - 7 - trifluoromethyl - 1H - 1,4-benzodiazepine hydrochloride A mixture of 200 g. of commercial precipitated manganese dioxide (General Metal Oxides) and 600 ml. of benzene was dried by heating under a Dean-Stark water trap for 4 hours. To this mixture was added 5 g. (17 mmoles) of 2,3-dihydro-5-phenyl-7-trifluoromethyl - 1H-1,4-benzodiazepine and heating was continued for 5.5 hours under the water separator. The mixture was allowed to stand overnight and the manganese dioxide filtered off. The filtrate was concentrated in vacuo to a yellow oil and treated with 50 ml. of ether and 5 ml. of 7 N methanolic hydrogen chloride. The yellow solid which separated was recrystallized from methanol/ether to give 7-trifluoromethyl-2,3-dihydro - 2 - methoxy - 5 - phenyl-1H-1,4-benzodiazepine hydrochloride, M.P. 180–188° (dec.). One further recrystallization from methanol/ether gave yellow needles, M.P. 179–181° (dec.).

EXAMPLE 7

Preparation of 2-anilino-7-chloro-2,3-dihydro-5-phenyl-1H-1,4-benzodiazepine 4-oxide A mixture of 1.5 g. of 7-chloro-5-phenyl-3H-1,4-benzodiazepine 4-oxide, 1.5 g. of aniline and 50 ml. of tetrahydrofuran was warmed in the steam bath and then allowed to stand at room temperature for one-half hour. The residue left on removing the solvent in vacuo was crystallized from ether to give 2-anilino-7-chloro-2,3-dihydro-5-phenyl-1H - 1,4 - benzodiazepine 4-oxide, M.P. 150–155° (dec.). Three recrystallizations from ethyl acetate gave pale yellow needles, M.P. 157–159° (dec.).

EXAMPLE 8

Preparation of 7-chloro-2-diethylamino-2,3-dihydro-5-phenyl-1H-1,4-benzodiazepine 4-oxide A suspension of 1.5 g. of 7-chloro-5-phenyl-3H-1,4-benzodiazepine 4-oxide in 10 ml. of diethylamine was shaken 10 minutes. The mixture was diluted with 40 ml. of tetrahydrofuran and 7-chloro-2-diethylamino-2,3-dihydro-5-phenyl - 1H - 1,4 - benzodiazepine 4-oxide, M.P. 140–145° (dec.), was collected. Recrystallization from ethyl acetate gave yellow prisms, M.P. 142–144° (dec.).

EXAMPLE 9

Preparation of 2-benzylthio-7-chloro-2,3-dihydro-5-phenyl-1H-1,4-benzodiazepine 4-oxide A mixture of 1.35 g. (5 mmoles) of 7-chloro-5-phenyl-3H-1,4-benzodiazepine 4-oxide, 2 ml. of benzyl mercaptan, 1 drop of triethylamine and 30 ml. of methylene chloride was kept at room temperature for 24 hours. The solvent was removed in vacuo and the residue crystallized from a mixture of ether and hexane to give 2-benzylthio-7-chloro - 2,3 - dihydro - 5 - phenyl - 1H-1,4-benzodiazepine 4-oxide, M.P. 110–115° (dec.). Recrystallization from ethyl acetate gave off-white needles, M.P. 116–123° (dec.).

EXAMPLE 10

Preparation of 7-chloro-2,3-dihydro-5-phenyl-2-piperidino-1H-1,4-benzodiazepine 4-oxide A mixture of 1.35 g. (5 mmoles) of 7-chloro-5-phenyl-3H-1,4-benzodiazepine 4-oxide, 1 ml. of piperidine and 30 ml. of methylene chloride was stirred for 24 hours at room temperature. From this mixture there was filtered 7 - chloro - 2,3 - dihydro - 5 - phenyl - 2 - piperidino-1H-1,4-benzodiazepine 4-oxide, M.P. 170–185° (dec.).

Recrystallization from methylene chloride/hexane gave pale yellow prisms, M.P. 180–183° (dec.).

EXAMPLE 11

Preparation of 7-chloro-2,3-dihydro-5-phenyl-2-piperidino-1H-1,4-benzodiazepine 4-oxide from 7-chloro-2,3-dihydro-2-methoxy-5-phenyl-1H-1,4-benzodiazepine 4-oxide A mixture of 2.0 g. of 7-chloro-2,3-dihydro-2-methoxy-5-phenyl-1H-1,4-benzodiazepine 4-oxide, 3 ml. of piperidine, and 25 ml. of methylene chloride was stirred at room temperature for 24 hours. The precipitate was collected and recrystallized from methylene chloride/hexane to give 7-chloro-2,3-dihydro-5-phenyl - 2 - piperidino-1H-1,4-benzodiazepine 4-oxide, M.P. 177–181° (dec.).

EXAMPLE 12

Preparation of 7-chloro-2,3-dihydro-2-methoxy-5-phenyl-1H-1,4-benzodiazepine hydrochloride To a solution of 4 g. of 7-chloro-5-phenyl-3H-1,4-benzodiazepine in 5 ml. of methanol was added 8 ml. of 6 N methanolic hydrogen chloride and 25 ml. of ether to form 7-chloro-2,3-dihydro - 2 - methoxy - 5 - phenyl-1H-1,4-benzodiazepine hydrochloride, M.P. 185–193° (dec.) which was collected and washed with ether. Recrystallization from methanol/ether gave yellow needles, M.P. 189–191° (dec.).

EXAMPLE 13

Preparation of 7-chloro-2,3-dihydro-5-phenyl-2-piperidino-1H-1,4-benzodiazepine

To a solution of 1.2 g. of 7-chloro-5-phenyl-3H-1,4-benzodiazepine in 20 ml. of absolute ether was added 1 ml. of piperidine. This mixture was allowed to stand at room temperature overnight, and 7-chloro-2,3-dihydro-5-phenyl-2-piperidino-1H-1,4-benzodiazepine, M.P. 130–137° (dec.), was collected. Recrystallization from ethyl acetate gave pale yellow spars, M.P. 130–135° (dec.).

EXAMPLE 14

Preparation of 7-chloro-2,3-dihydro-5-phenyl-2-isopropylamino-1H-1,4-benzodiazepine 4-oxide A solution of 5 g. of 7-chloro-5-phenyl-3H-1,4-benzodiazepine 4-oxide and 5 g. of isopropylamine in 100 ml. of tetrahydrofuran was kept at room temperature overnight, and then concentrated in vacuo. The residue crystallized from ether/petroleum ether to give 7-chloro-2,3-dihydro-5-phenyl-2-isopropylamino-1H - 1,4 - benzodiazepine 4-oxide, M.P. 145–150° (dec.). Recrystallization from ethyl acetate gave pale yellow prisms, M.P. 142–145° (dec.).

EXAMPLE 15

Preparation of 7-chloro-2,3-dihydro-2-(α-iminomethoxymethyl)-5-phenyl-1H-1,4-benzodiazepine 4-oxide A mixture of 3 g. (10 mmoles) of 7-chloro-2,3-dihydro-2-methoxy-5-phenyl-1H-1,4-benzodiazepine 4-oxide and 0.6 g. (12 mmoles) of sodium cyanide in 50 ml. of anhydrous methanol was stirred for 5 hours at room temperature. It was then neutralized with methanolic hydrogen chloride and concentrated in vacuo. The residue was dissolved in 100 ml. of methylene chloride, washed with 100 ml. of 10 percent sodium bicarbonate solution and dried over sodium sulfate. Concentration of the solution in vacuo left a yellow foam which crystallized from ether/ethyl acetate to give 7-chloro-2,3-dihydro-2-(α-iminomethoxymethyl)-5-phenyl-1H - 1,4 - benzodiazepine 4-oxide, M.P. 168–173° (dec.). Recrystallization from ethyl acetate gave yellow prisms, M.P. 168–171° (dec.).

EXAMPLE 16

Preparation of 7-chloro-2,3-dihydro-5-phenyl-1H-1,4-benzodiazepine-2-carboxylic acid 4-oxide A mixture of 1 g. (3 mmoles) of 7-chloro-2,3-dihydro-2-(α-iminomethoxymethyl) - 5 - phenyl - 1H - 1,4 - benzodiazepine 4-oxide, 3 ml. of 1 N sodium hydroxide and 7 ml. of water was heated under reflux for 15 minutes, cooled and filtered. The filtrate was neutralized with hydrochloric acid and 7-chloro-2,3-dihydro-5-phenyl-1H-1,4-benzodiazepine-2-carboxylic acid 4-oxide, M.P. 170–200° (dec.), was collected. Recrystallization from methanol gave yellowish needles, M.P. 205–208° (dec.).

EXAMPLE 17

Preparation of 7-chloro-2,3-dihydro-5-phenyl-1H-1,4-benzodiazepine-2-carboxylic acid methyl ester 4-oxide A solution of 1 g. (3 mmoles) of 7-chloro-2,3-dihydro-2 - (α-iminomethoxymethyl) - 5 - phenyl - 1H - 1,4-benzodiazepine 4-oxide in 10 ml. of 1 N hydrochloric acid was allowed to stand for 15 minutes at room temperature. The aqueous phase was decanted and residual oil dissolved in methylene chloride. This solution was washed with sodium bicarbonate solution, water and brine, and dried. Removal of the solvent in vacuo left an oil which was crystallized from ethyl acetate/petroleum ether to give 7-chloro-2,3-dihydro-5-phenyl-1H-1,4-benzodiazepine-2-carboxylic acid methyl ester 4-oxide, M.P. 138–157° (dec.). Recrystallization from isopropyl alcohol/water gave pale yellow prisms, M.P. 154–156°.

EXAMPLS 18

Preparation of 7-chloro-2,3-dihydro-2-(2-imidazolin-2-yl)-5-phenyl-1H-1,4-benzodiazepine 4oxide A mixture of 5.5 g. (16.7 mmoles) of 7-chloro-2,3-dihydro-2 - (α - iminomethoxymethyl) - 5 - phenyl - 1H-1,4-benzodiazepine 4-oxide, 5.5 ml. of ethylenediamine, 175 ml. of methanol, and 1.5 ml. of 6 N methanolic hydrogen chloride was heated under reflux for 18 hours. The solution was concentrated to dryness in vacuo and the residue crystallized from ether to give 2.9 g. (50 percent) of 7 - chloro - 2,3 - dihydro - 2 - (2 - imidazolin-2-yl)-5-phenyl-1H - 1,4 - benzodiazepine 4-oxide, M.P. 189–192°. Recrystallization from ethanol gave yellow prisms, M.P. 187–188°.

We claim:
1. A compound of the formula

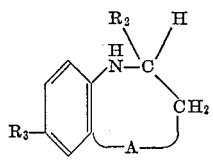

wherein A represents the group

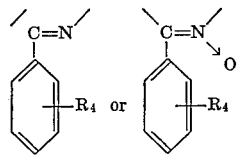

$R_2$ represents hydroxy, lower alkoxy, phenoxy, phenyl lower alkoxy, amino, cyano, carboxy, a substituted amino group of the formula

a thio group of the formula —S—$R_7$, lower alkoxyformimidoyl, lower alkanoyloxy, benzoyloxy, lower alkoxycarbonyl, or

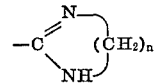

wherein $n$ is an integer from 2 to 4; $R_3$ represents hydrogen, halogen, trifluoromethyl, lower alkyl, lower alkoxy, nitro, lower alkylthio, lower alkyl sulfinyl and lower alkyl sulfonyl; $R_4$ represents hydrogen, halogen, trifluoromethyl, lower alkyl, lower alkoxy, nitro, cyano, amino, lower alkylthio, lower alkylsulfinyl or lower alkyl sulfonyl; $R_5$ and $R_6$ are each independently selected from the group consisting of hydrogen, lower alkyl, phenyl, phenyl lower alkyl, lower alkanoyl or benzoyl, and taken together with the nitrogen atom to which they are attached represent alkylene imino in which the lower alkylene radical contains from 3 to 6 carbon atoms; and $R_7$ represents hydrogen, lower alkyl, phenyl or phenyl lower alkyl, and acid addition salts thereof.

2. A compound of the formula

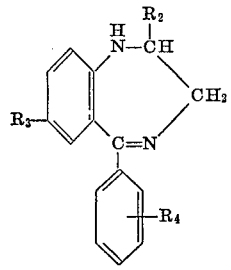

wherein
$R_2$ represents hydroxy, lower alkoxy, phenoxy, phenyl lower alkoxy, amino, cyano, a substituted amino group of the formula

a thio group of the formula —S—$R_7$, lower alkoxyformimidoyl, lower alkanoyloxy, benzoyloxy, lower alkoxycarbonyl, or

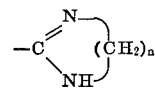

wherein $n$ is an integer from 2 to 4; $R_3$ represents hydrogen, halogen, trifluoromethyl, lower alkyl, lower alkoxy, nitro, lower alkylthio, lower alkyl sulfinyl or lower alkyl sulfonyl; $R_4$ represents hydrogen, halogen, trifluoromethyl, lower alkyl, lower alkoxy, nitro, cyano, amino, lower alkylthio, lower alkyl sulfinyl or lower alkyl sulfonyl; $R_5$ and $R_6$ are each independently selected from the group consisting of hydrogen, lower alkyl, phenyl, phenyl lower alkyl, lower alkanoyl or benzoyl, and taken together with nitrogen atom to which they are attached represent alkylene imino in which the lower alkylene radical contains from 3 to 6 carbon atoms; and $R_7$ represents hydrogen, lower alkyl, phenyl or phenyl lower alkyl, and acid addition salts thereof.

3. A compound of claim 2 wherein $R_2$ is lower alkoxy.

4. A compound of claim 2 wherein $R_2$ represents the group

wherein $R_5$ and $R_6$ are each independently selected from the group consisting of hydrogen, lower alkyl, phenyl, phenyl lower alkyl, lower alkanoyl or benzoyl, and taken together with the nitrogen atom to which they are attached represent alkylene imino in which the lower alkylene radical contains from 3 to 6 carbon atoms.

5. A compound of the formula

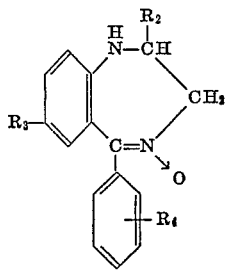

wherein $R_2$ represents hydroxy, lower alkoxy, phenoxy, phenyl lower alkoxy, amino, cyano, a substituted amino group of the formula

a thio group of the formula —S—$R_7$, lower alkoxy-formimidoyl, lower alkanoyloxy, benzoyloxy, lower alkoxycarbonyl, or

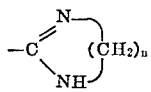

wherein $n$ is an integer from 2 to 4; $R_3$ represents hydrogen, halogen, trifluoromethyl, lower alkyl, lower alkoxy, nitro, lower alkylthio, lower alkyl sulfinyl or lower alkyl sulfonyl; $R_4$ represents hydrogen, halogen, trifluoromethyl, lower alkyl, lower alkoxy, nitro, cyano, amino, lower alkylthio, lower alkyl sulfinyl or lower alkyl sulfonyl; $R_5$ and $R_6$ are each independently selected from the group consisting of hydrogen, lower alkyl, phenyl, phenyl lower alkyl, lower alkanoyl or benzoyl, and taken together with the nitrogen atom to which they are attached represent alkylene imino in which the lower alkylene radical contains from 3 to 6 carbon atoms; and $R_7$ represents hydrogen, lower alkyl, phenyl or phenyl lower alkyl, and acid addition salts thereof.

6. A compound of claim 5 wherein $R_2$ is lower alkoxy.

7. A compound of claim 5 wherein $R_2$ represents the group

wherein $R_5$ and $R_6$ are each independently selected from the group consisting of hydrogen, lower alkyl, phenyl, phenyl lower alkyl, lower alkanoyl or benzoyl, and taken together with the nitrogen atom to which they are attached represent alkylene imino in which the lower alkylene radical contains from 3 to 6 carbon atoms.

8. A compound of the formula

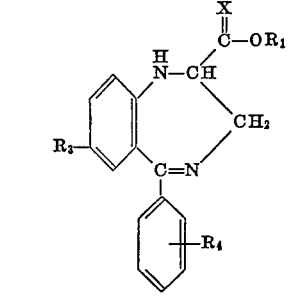

wherein $R_1$ is hydrogen or lower alkyl; $R_3$ represents hydrogen, halogen, trifluoromethyl, lower alkyl, lower alkoxy, nitro, lower alkylthio, lower alkyl sulfinyl or lower alkyl sulfonyl; $R_4$ represents hydrogen, halogen, trifluoromethyl, lower alkyl, lower alkoxy, nitro, cyano, amino, lower alkylthio, lower alkyl sulfinyl or lower alkyl sulfonyl; and X is an oxygen atom or an imino group.

9. A compound of the formula

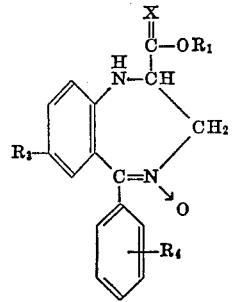

wherein $R_1$ is hydrogen or lower alkyl; $R_3$ represents hydrogen, halogen, trifluoromethyl, lower alkyl, lower alkoxy, nitro, lower alkylthio, lower alkyl sulfinyl or lower alkyl sulfonyl; $R_4$ represents hydrogen, halogen, trifluoromethyl, lower alkyl, lower alkoxy, nitro, cyano, amino, lower alkylthio, lower alkyl sulfinyl or lower alky sulfonyl; and X is an oxygen atom or an imino group.

10. 7 - chloro - 2 - ethoxy - 2,3 - dihydro - 5 - phenyl-1H-1,4-benzodiazepine 4-oxide.

11. 7 - chloro - 2,3 - dihydro - 2 - methoxy - 5 - phenyl-1H-1,4-benzodiazepine 4-oxide.

12. 7 - trifluoromethyl - 2,3 - dihydro - 2 - methoxy - 5-phenyl-1H-1,4-benzodiazepine.

13. 7 - chloro - 2 - diethylamino - 2,3 - dihydro - 5-phenyl-1H-1,4-benzodiazepine 4-oxide.

14. 7 - chloro - 2,3 - dihydro - 2 - methoxy - 5 - phenyl-1H-1,4-benzodiazepine.

15. 7 - chloro - 2,3 - dihydro - 5 - phenyl - 2 - isopropylamino-1H-1,4-benzodiazepine 4-oxide.

16. The compounds of claim 8 or 9 wherein X is an oxygen atom.

17. The compounds of claim 8 or 9 wherein X is an imino group.

References Cited

UNITED STATES PATENTS 2,893,922  7/1959  Sternbach _____ 260—239
3,051,701  8/1962  Reeder et al. _____ 260—239

HENRY R. JILES, Primary Examiner

R. T. BOND, Assistant Examiner

U.S. Cl. X.R.

260—251, 256.4, 309.6, 566; 424—273, 244, 251